US008151580B1

(12) United States Patent
 Cantolino (10) Patent No.: US 8,151,580 B1
(45) Date of Patent: Apr. 10, 2012

(54) FLUID-SENSING SWITCH SYSTEM WITH REDUNDANT SAFETY RESPONSE CAPABILITY

(76) Inventor: Christopher Ralph Cantolino, Bradenton, FL (US)

( * ) Notice: Subject to any disclaimer, the term of this patent is extended or adjusted under 35 U.S.C. 154(b) by 745 days.

(21) Appl. No.: 12/337,574

(22) Filed: Dec. 17, 2008

(51) Int. Cl.
 *F25D 21/00* (2006.01)
(52) U.S. Cl. .......................................................... 62/150
(58) Field of Classification Search ............... 62/93, 150, 62/285, 291
 See application file for complete search history.

(56) References Cited

U.S. PATENT DOCUMENTS

2003/0221439 A1* 12/2003 Bush et al. ...................... 62/285
2006/0208915 A1* 9/2006 Oakner et al. ................ 340/620

* cited by examiner

*Primary Examiner* — Melvin Jones
(74) *Attorney, Agent, or Firm* — Dorothy S. Morse (57) ABSTRACT

A fluid-sensing switch system that can monitor pre-established threshold fluid levels in the primary drain pan inside an air conditioning unit or other condensate-producing unit, and also in a secondary drain pan positioned under the unit, providing redundant safety response capability. Once the threaded plug of a sensing probe is connected to the unit's weep hole, it positions a center sensor extending through a false-trigger-reducing resilient piece in a position to wait for rising fluid capable of breaching a weep hole dam. The center sensor provides a first power potential, while a circular sensor also present provides the second power potential needed for signal generation. A signal-generating member connected to both sensors is electrically connected to the unit to shut it off, and/or activate a pump that removes fluid from the secondary drain pan. When mounted on a secondary drain pan, the signal-generating member provides the redundant safety response capability.

30 Claims, 10 Drawing Sheets

FLUID-SENSING SWITCH SYSTEM WITH REDUNDANT SAFETY RESPONSE CAPABILITY

CROSS-REFERENCES TO RELATED APPLICATIONS

None

BACKGROUND

1. Field of the Invention

The present invention generally relates to water detection systems associated with the drain pan placed under the air handling unit of an air conditioning system or associated with the drain line connected to the weep hole of the air handling unit, and more particularly relates to a fluid-sensing switch system that monitors a pre-established threshold fluid level in the primary drain pan inside an air conditioning unit or other condensate-producing unit, and also monitors a typically different pre-established threshold fluid level in a secondary drain pan positioned under the unit, providing redundant safety response capability. Instead, prior art systems monitor the fluid level in the drain line carrying water or other fluid away from the unit's weep hole or monitor the fluid level in the secondary drain pan, but do not monitor the fluid level in the primary drain pan inside the air conditioning unit or other condensate-producing unit. Once the threaded plug of a sensing probe in the present invention is connected to the unit's weep hole, it positions a center sensor extending through its false-trigger-reducing resilient piece in a position to wait for fluid rising over a dam, without prematurely causing any activation as a result of water collected behind the dam. The resilient piece has opposing ends and a cone associated with each opposing end, one of which provides a drip path to wick fluid away from the center sensor. The center sensor provides a first power potential, while a circular sensor also present provides the second power potential needed for safety-related signal generation, with the second power potential being a neutral potential. A signal-generating member connected to both sensors is electrically connected to the fluid-producing unit to shut it off, and/or to a pump for its activation to remove fluid from the secondary drain pan. The signal-generating member is also placed in association with the secondary drain pan to monitor a pre-established threshold fluid level therein. Mounting of the signal-generating member to a vertically-extending wall of the secondary drain pan is preferably accomplished via double-sided tape and/or fasteners.

2. Description of the Related Art

Air handling systems such as furnaces or other heating, ventilating, or air conditioning systems associated with a building structure typically have a drain pan underneath at least portions of the air handling unit to catch collected condensation and prevent damage that would otherwise result from fluid overflow. Such damage can be to the unit itself, and/or its surroundings. However, the condensation produced in a twenty-four hour period can be more than the drain pan can hold. This is a particularly common occurrence with some air conditioning systems. Therefore, the drain pans thereof are often mounted in a non-level orientation and connected to a drain pipe or hose that carries the collected condensate to a suitable location outside the structure. However, in some fluid collection applications the removal of condensate from a secondary drain pan requires pumping. Typically when a secondary drain pan is used, a fluid level sensing unit is placed in association with it. Thereafter, when the depth of collected condensate reaches a predetermined threshold level, the fluid level sensing unit generates a signal and sends it to a fluid-sensing switch systeming circuit to activate the pump. When sufficient water is removed from the drain pan for the water sensor to stop sending the activation signal, the fluid-sensing switch systeming circuit deactivates the pump. In this manner, the pump is only activated when necessary to pump water out of the drain pan, thereby prolonging the life of the pump, while preventing water from overflowing the vertically-extending walls of the drain pan.

Many prior art fluid level sensors in current use contain an upwardly-deployable float body. One disadvantage thereof is that during installation time-consuming float body height adjustment is typically needed to make certain that fluid collected in the associated secondary drain pan does not flow over the pan's vertically-extending walls, taking into consideration that condensate production does not immediately cease when the fluid-producing unit is shut off. The float body also requires a level orientation for proper and reproducible operation. If a float sensor is not correctly oriented, its float body may not immediately deploy and the pump may not be activated in time before fluid overflows the drain pan's vertically-extending walls. Such overflow generally leads to damage in the area around the secondary drain pan, which may involve a floor, walls, a ceiling, and/or fixtures associated therewith, as well as other items located nearby. In addition, false signaling may occur that causes pump activation when insufficient water is present, thereby damaging the pump. Thus, what is needed to provide a solution for all of the disadvantages noted above in the prior art, is a fluid level sensing unit for a collection/drain pan used with condensates or other fluids, which is durable for long-lasting and predictable use, has a reduced sensitivity to false signaling, does not require undue effort for accurate orientation, and can be relied upon to produce a signal after only a small amount fluid collects in the pan. These are all features provided by the present invention. Other desirable features and characteristics of the present invention will become apparent from the following invention description and its appended claims, as well as the accompanying drawings.

BRIEF SUMMARY OF THE INVENTION

It is the primary object of this invention to provide a fluid-sensing switch system that monitors a pre-established threshold fluid level in the primary drain pan inside an air conditioning unit or other condensate-producing unit, and also in a secondary drain pan positioned under the unit, providing redundant safety response capability. It is also an object of this invention to provide a fluid-sensing switch system that has a reduced sensitivity to false signaling. In addition, it is an object of this invention to provide a fluid-sensing switch system that is convenient to use and does not require undue effort for accurate positioning and orientation during its installation. It is also an object of this invention to provide a fluid-sensing switch system that can be relied upon to produce a signal after only a small amount fluid collects in the pan. It is a further object of this invention to provide a fluid-sensing switch system with a signal-generating member that can be used independently from its probe to monitor the pre-established threshold fluid level in a secondary drain pan. It is also an object of this invention to provide a fluid-sensing switch system that is adapted for convenient installer mounting to a vertically-extending wall of the secondary drain pan by at least two alternative means. In addition, it is an object of this invention to provide a fluid-sensing switch system that is cost effective to manufacture and requires no assembly at its installation site.

The present invention, when properly made and used, provides safety response capability via the probe of a fluid-sensing switch system that is able to monitor a pre-established threshold fluid level in the primary drain pan inside an air conditioning unit or other condensate-producing unit, and also via the system's signal-generating member that when placed in association with a secondary drain pan positioned under the unit is able to monitor a typically different pre-established threshold fluid level therein. Thus, one unit can be used to serve both monitoring needs and provide redundant safety response capability. The preset invention fluid-sensing switch system is designed and constructed to activate when only a small amount of fluid is collected in either pan, which reduces the overall risk of fluid damage to surroundings. It also has a reduced sensitivity to false signaling due to the design and structure of its probe, which includes a resilient piece with a cone that provides a drip path to wick fluid away from its center sensor, and also due to a signal-generating member that has no deployable float. The simple interior structure of its signal-generating member lowers manufacturing cost, and since its signal-generating member has no deployable float and may cause signal generation when collected fluid comes into contact with only one of the wires connected to it, its installation is simple and easy. Furthermore, the present invention fluid-sensing switch system can be relied upon to produce a signal after only a small amount fluid collects in either pan little, resulting in little or no false signal generation. Also, its fluid-sensing switch system has a signal-generating member that can be used independently from its probe to monitor the pre-established threshold fluid level in a secondary drain pan. Added convenience is provided since the present invention fluid-sensing switch system is adapted for convenient mounting to a vertically-extending wall of the secondary drain pan by at least two alternative means, double-sided tape and fasteners. Once the threaded plug of its sensing probe is connected to the unit's weep hole, it positions a center sensor extending through a false-trigger-reducing resilient piece in a position within the unit to wait for fluid rising over a dam, without being prematurely activated as a result of water collected behind the dam. The center sensor provides a first power potential, while a circular sensor also present provides the second neutral power potential needed for signal generation. The signal-generating member electrically connected to both sensors is also electrically connected to the unit to shut it off, and/or activate a pump that removes fluid from the secondary drain pan located under the unit for safety-enhanced unit operation.

Thus, the present invention is a fluid-sensing switch system that provides generation of a predetermined output in response to a water sensor input. The fluid-sensing switch system includes a first input, a second input, and an output. The first input couples a source line to a first power potential. The second input couples a neutral line to a second power potential, the second power potential being a neutral potential. The output couples a load line to the fluid-producing unit for shutting it off and/or to a pump capable of evacuating water from an associated drain pan positioned under a fluid-producing unit. A signal-producing member connected to the first and second inputs generates a switching signal in response to the drain pan water level detection signal. Since the signal-producing member connects the first input to the output in response to the switching signal, the first power potential as a predetermined output to the pump is provided. Furthermore, the signal-producing member generates a drain pan water level detection signal in response to detection of water in a drain pan having a water level greater than or equal to a predetermined water level.

BRIEF DESCRIPTION OF THE SEVERAL VIEWS OF THE DRAWINGS

One reviewing the accompanying figures must understand that they have not necessarily been drawn to scale and are illustrated for simplicity and clarity. As a result, in some of the illustrations only those components that are pertinent to understanding the present invention may be shown and/or numbered. Identical numbering is given to identical or functionally similar elements throughout the separate figures, thereby attempting to illustrate the most preferred embodiment of the present invention while explaining various principles and advantages thereof. Also, during review of the accompanying figures one must appreciate that the dimensions of some of the elements in them may be exaggerated where needed relative to other elements to help provide a better understanding of the present invention. In most instances, such exaggeration will be noted.

DETAILED DESCRIPTION OF THE INVENTION

The following description of the most preferred embodiment of the present invention is merely exemplary in nature and is not intended to limit the invention's structure, function, or application. However, with that said, the present invention provides a fluid-sensing switch system 1 that monitors a pre-established threshold fluid level in the primary drain pan (not shown) inside an air conditioning unit or other condensate-producing unit (not shown), and also monitors a typically different pre-established threshold fluid level in a secondary drain pan (not shown) positioned under the unit, providing the option for redundant safety response capability. If a secondary drain pan is not employed under the fluid-producing unit associated with the sensing probe 11 of the present invention fluid-sensing switch system 1, the signal-producing member 2 associated with sensing probe 11 may be mounted in any convenient location that permits it to fulfill its intended function. In contrast, prior art systems (not shown) are configured and positioned to monitor the fluid level in the drain line carrying water or other fluid away from the weep hole of an air conditioning unit or other condensate-producing unit, or in the alternative are configured and positioned to monitor the fluid level in a secondary drain pan, but do not have the capability to monitor the fluid level in the primary drain pan inside the air conditioning unit or other condensate-producing unit. Once the threaded plug 12 of the sensing probe 11 in the most preferred embodiment 1 of the present invention is connected to the unit's weep hole, it positions a center sensor 18 extending through a false-trigger-reducing resilient piece 13 in a position to wait for fluid rising over a dam (not shown), without prematurely causing any signal activation as a result of water collected behind the dam. The resilient piece 13 has opposing ends and a cone associated with each opposing end, one of which provides a drip path to wick fluid away from the center sensor 18. The center sensor 18 provides a first power potential, while a circular sensor 19 also present provides the second power potential needed for safety-enhancing signal generation, with the second power potential being a neutral potential. A signal-generating member 2 connected to both sensors (18 and 19) is electrically connected to the fluid-producing unit (not shown) to shut it off, and/or to a pump (not shown) for its activation to remove fluid from the secondary drain pan. The signal-generating member 2 may also placed in association with the secondary drain pan for cost efficient monitoring of a pre-established threshold fluid level therein. Mounting of the signal-generating member 2 to a vertically-extending wall of the secondary drain pan is preferably accomplished via double-sided tape 34 and/or fasteners connected through holes in mounting brackets 7.

Although not shown, the present invention is commonly used to monitor the air handling system (not shown) in a building structure to provide safe and proper system operation. An air handler, such as a forced air furnace, ventilator, or cooler, receives air from an intake and pushes the air out through a duct. During the air handling process, the temperature of the air is altered as it passes through the air handler. Such activity produces condensation, particularly when the air is cooled by an air conditioning system associated with the air handler. Under the influence of gravity, condensation is typically collected by a primary drain pan located within the air handler, with a secondary drain pan also optionally present to collect additional fluid under the air handler and reduce the opportunity for fluid damage to the unit itself and/or its surroundings. However, the condensation produced in a twenty-four hour period can be more than the secondary drain pan can hold. Thus, the present invention provides safe and proper air handling system operation by an association with the primary drain pan within the system, and preferably also (but optionally) through association with a secondary drain pan placed at least in part under the air handling system. When a secondary drain pan is used and the signal-producing member 2 of the present invention is placed in association with it, signal-producing member 2 provides cost-efficient redundant safety response capability not provided by any known prior art fluid-level monitoring devices. Although not limited to the following dimension examples, signal-generating member 2 may have length and/or width dimensions between two and three inches, the thickness dimension of signal-generating member 2 may be between one and two inches, and the length and diameter dimensions of sensing probe 11 may be between one and two inches. Furthermore, although the materials used for the components of the present invention may vary, it is preferred that they have a temperature rating at least up to 275-degrees.

Figure 1:
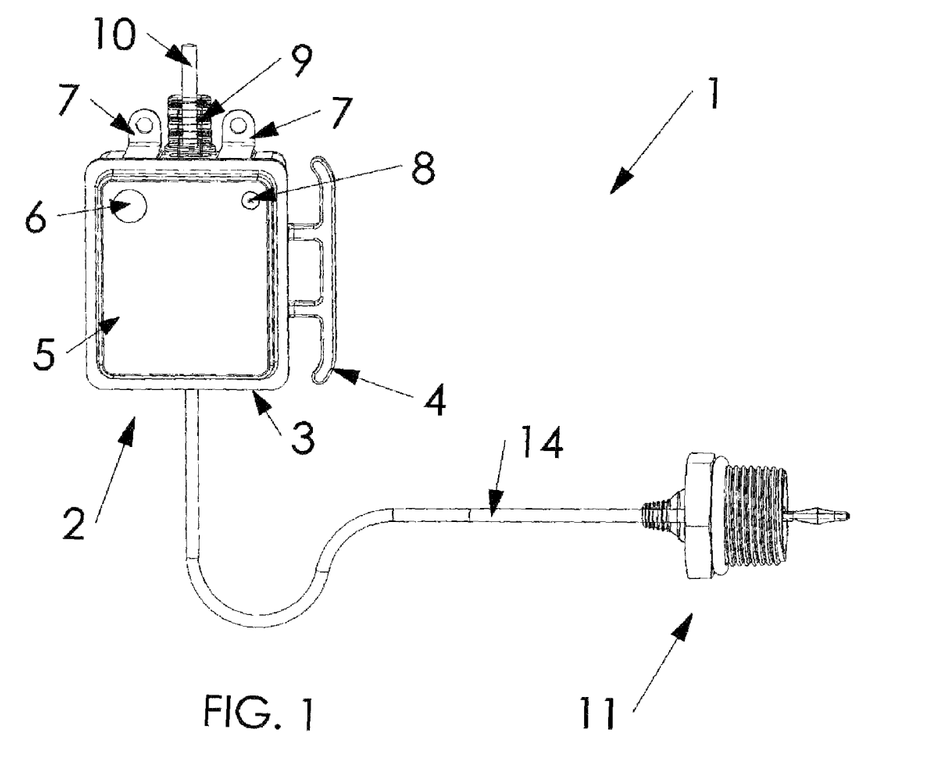
FIG. 1 is a front view of the most preferred embodiment of the present invention with a sensing probe electrically connected to a signal-producing member.

FIG. 1 shows the most preferred embodiment of the present invention 1 with a sensing probe 11 electrically connected via wiring 14 to a signal-producing member 2. The features and component positioning for sensing probe 11 are disclosed in more detail in FIGS. 4-14, and are not described in detail in FIG. 1. It is sensing probe 11 that monitors the water level in the primary drain pan of a fluid-producing unit (not shown). However, FIG. 1 does show the outer case 3 of signal-producing member 2 having cable wrapping feature 4 that is used by an installer to downwardly adjust the length of wiring 14 to accommodate the application where needed. FIG. 1 also shows the signal output wire 10 that is used to transmit a shut-off or activation signal generated by signal-producing member 2 to a fluid-producing unit or pump associated with a secondary drain pan. FIG. 1 further shows over-molding 9 that secures signal output wire 10 in place and provides a watertight seal around signal output wire 10. In addition, FIG. 1 shows two mounting brackets 7, one on each side of signal output wire 10 and over-molding 9 that can be used with fasteners (not shown) to secure outer case 3 to the vertically-extending wall of a secondary drain pan (not shown). A label 5 is shown extending substantially across the front portion of outer case 3, with accommodation 6 shown for the electrical connection means 31 secured to printed circuit board 33 that provides electrical communication via feature 30/46 on cover 28 with output signal wire 10 and the accommodation 8 shown for a lamp 47 that provides visual evidence of signal production by signal-generating member 2 (which can also be used by an installer to confirm proper operation at the time of installation as lamp 47 lights up when current is running through it). Although not shown, an audible alarm may also be associated with outer case 3 and powered via electrical connection to printed circuit board 33. The perimeter configuration of outer case 3 is not limited to that shown in FIG. 1, but design considerations for its size and shape should be guided by cost-efficient objectives and space limitations shared by common installation sites. The configuration of wore wrapping feature 4 is also not limited to that shown in FIG. 1, and its design considerations should also be guided by cost-efficient objectives and space limitations shared by common installation sites. In addition, the amount and configuration of material around the holes in mounting brackets 7 is not critical, although material without sharp corners is preferred. Furthermore, the positioning and configuration of accommodations 6 and 8 are not critical, and the configuration and positioning of over-molding 9 is not limited to that shown in FIG. 1, however, use of resilient material and a configuration allowing for pull-through seating of over-molding 9 within aperture 38 to provide a secure and watertight seal around signal output wire 10 are preferred.

Figure 2:
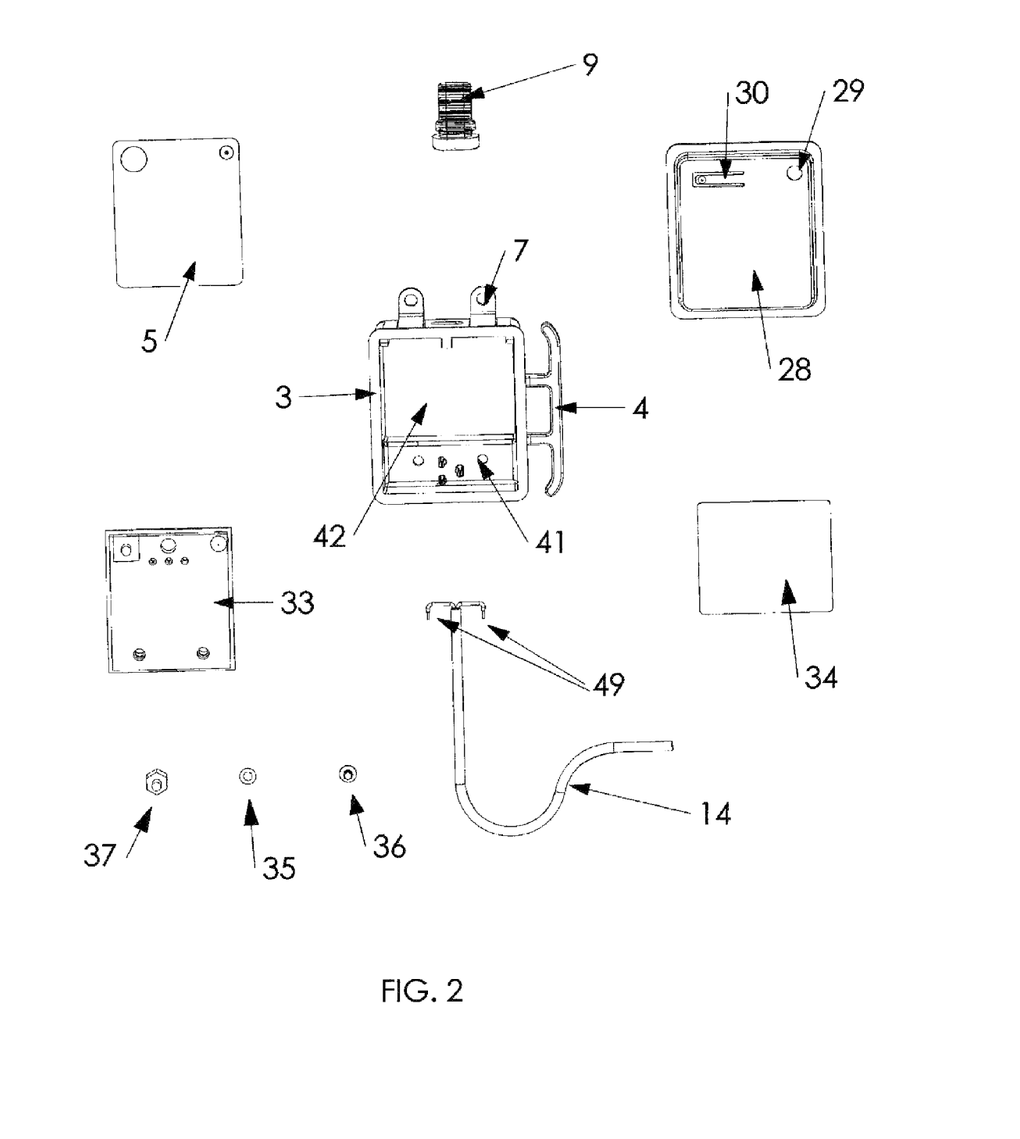
FIG. 2 is an exploded front view of a signal-producing member that can be used in the most preferred embodiment of the present invention after its label and cover are removed.
Figure 3:
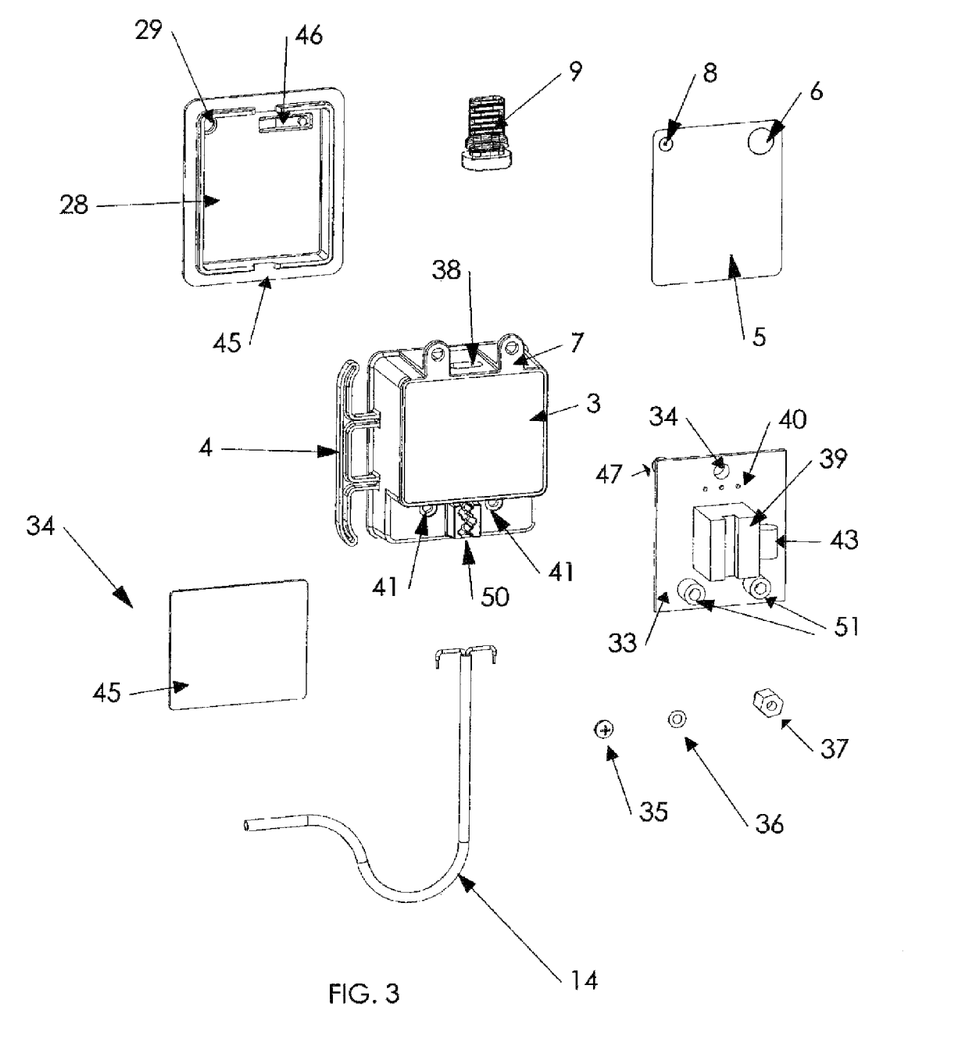
FIG. 3 is an exploded front view of a signal-producing member that can be used in the most preferred embodiment of the present invention after its label and cover are removed and invention components in the same positions relative to the outer case as is shown in FIG. 2.

FIGS. 2 and 3 each show an exploded view of a signal-producing member 2 that can be used in the most preferred embodiment of the present invention. Both show label 5, over-molding 9, front cover 28, printed circuit board 33, double-sided tape 34, wiring 14, and one of the fasteners 37, O-rings 35, and nuts 36 used to fasten wiring 14 in a fixed position relative to outer case 3 being removed from outer case 3 and positioned in a similar position relative to outer case 3 in both illustrations. FIG. 2 provides a front view of all invention components present, while FIG. 3 provides a back view of the same invention components. In FIGS. 2 and 3 outer case 3 is shown centrally. Directly above outer case 3 in both FIGS. 2 and 3 is over-molding 9, the configuration of which is intended to fit closely around signal output wire 10. Also, it is contemplated for over-molding 9 to be made from resilient material for pull-through association with aperture 38 (best seen in FIG. 3 between the two mounting brackets 7). On the upper left of outer case 3 in FIG. 2 (and correspondingly on the upper right of outer case 3 in FIG. 3), label 5 is shown to have a generally rectangular configuration, as well as accommodations 6 and 8 for a lamp 47 and electrical connection means 31 for output signal wire 10. The presence of lamp 47 is preferred for test purposes during installation to confirm proper operation of signal-producing member 2 and sensing probe 11, however, the present of an audible alarm can be optional.

On the upper right of outer case 3 in FIG. 2 (and correspondingly on the upper left of outer case 3 in FIG. 3), cover 28 is shown to have an opening 29 through which lamp 47 can extend, means 30 and 46 to secure the electrical connection means 31 for output signal wire 10 in a fixed position relative to outer case 3, and a notch 45 configured to accommodate unnumbered connecting tabs for wire clamp 50 (shown on the back of outer case 3 in FIG. 3) that extend through outer case 3 and are shown between the two fastener holes 41 each in an opposed position to a different one of the mounting brackets 7 in FIG. 2. Since no attachment holes are shown through cover 28 or label 5, it is assumed that cover 28 is secured against outer case 3 via snap-fit connection and that label 5 is adhered to cover 28 via adhesive and/or bonding agents (not shown). Additionally, on the lower left of outer case 3 in FIG. 2 (and correspondingly on the lower right of outer case 3 in FIG. 3), printed circuit board 33 is shown to have a generally rectangular configuration, as well as an through-hole 34, small vent openings 40, a signal-generating module 43, a centrally-located feature 39 that optimally positions and strengthens printed circuit board 33, and mounting tubes 51 adapted for use in connecting wiring 14 to printed circuit board 33. On the lower right of outer case 3 in FIG. 2 (and correspondingly on the lower left of outer case 3 in FIG. 3), double-sided tape 34 is shown to have a generally rectangular configuration, with the rear surface of double-sided tape 34 marked with the number 45 to indicate a protective liner that is immediately releasable prior to installation should adhesive layer (not shown) under protective liner 45 be desired for use in attaching outer case 3 to the vertically-extending wall (not shown) of a secondary drain pan. Shown beneath outer case 3 in both FIGS. 2 and 3 is the wiring 14 that is used to connect center sensor 18 and circular sensor 19 in sensing probe 11 to the signal-generating module 43 connected to the printed circuit board 33 fixed within outer case 3. In FIG. 2 the ends of wiring 14 are identified by the number 49, which are each connected through a different one of the tubes 51 through printed circuit board 33 via a fastener 35, O-ring 36, and nut 37, also shown in FIGS. 2 and 3 below printed circuit board 33. Although the configurations and relative sizes of present invention components shown in FIGS. 2 and 3 are preferred, some variation in perimeter configuration, size, connection, and/or number can be expected (such as the number of fasteners 35, O-rings 36, mounting brackets 7, and the like that are employed).

Figure 4:
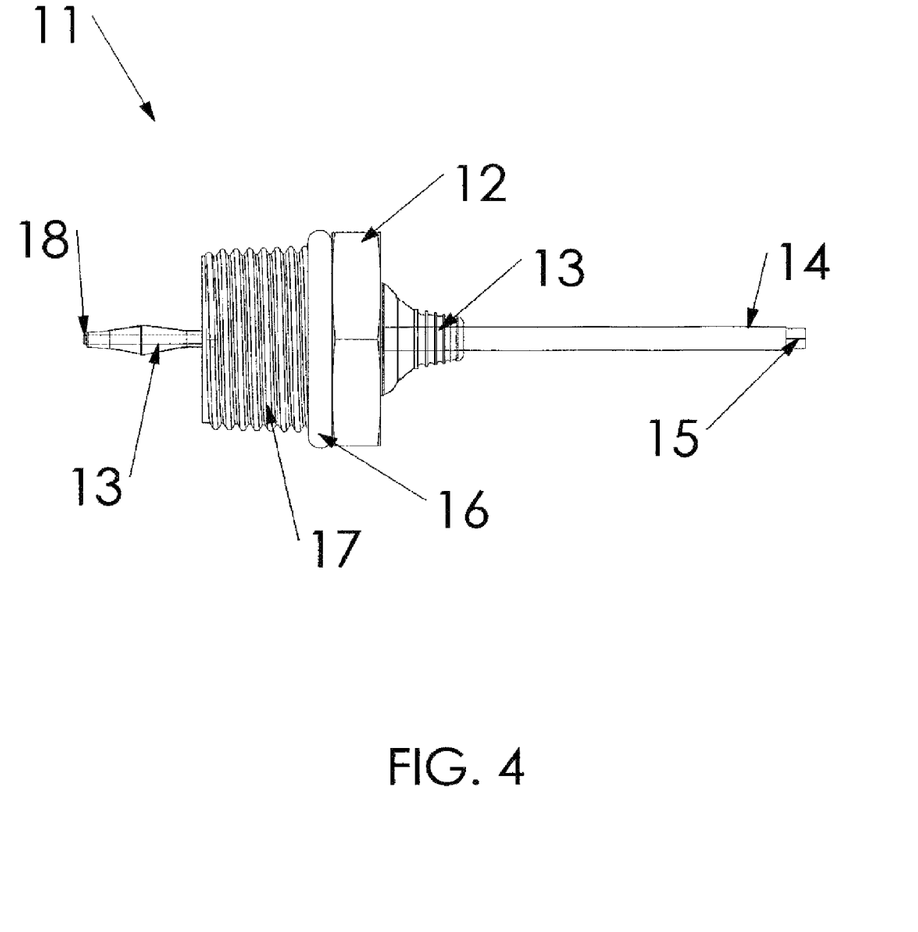
FIG. 4 is a side view of a sensing probe that can be used in the most preferred embodiment of the present invention.
Figure 5:
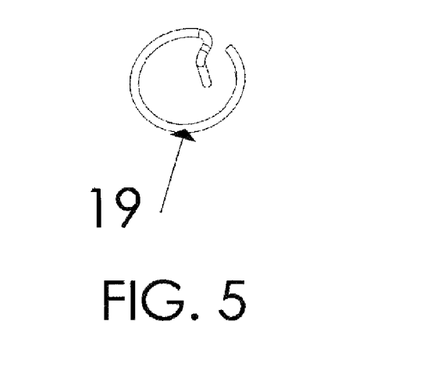
FIG. 5 is a perspective view of a circular sensor that can be used in the most preferred embodiment of the present invention.
Figure 6:
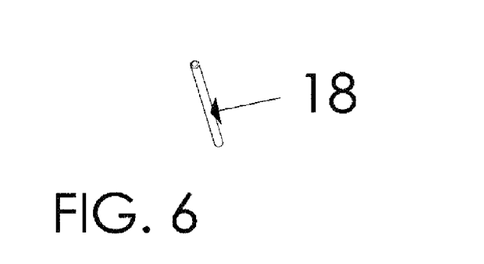
FIG. 6 is a perspective view of a center sensor that can be used in the most preferred embodiment of the present invention.
Figure 7:
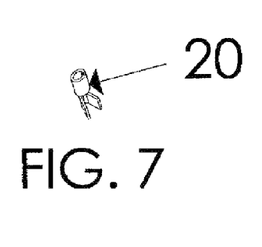
FIG. 7 is a perspective view of a wire terminal that can be used in the most preferred embodiment of the present invention.
Figure 8:
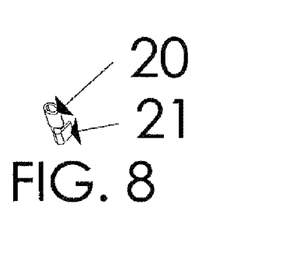
FIG. 8 is a perspective view of the wire terminal shown in FIG. 7 that is rotated approximately 90-degrees from the position illustrated in FIG. 7
Figure 9:
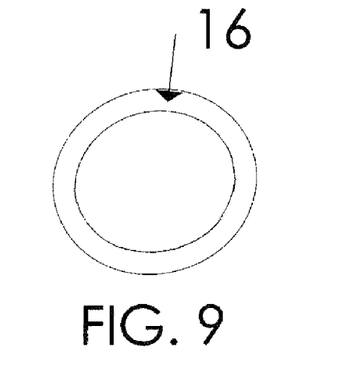
FIG. 9 is a front view of an O-ring that can be used in the most preferred embodiment of the present invention.
Figure 10:
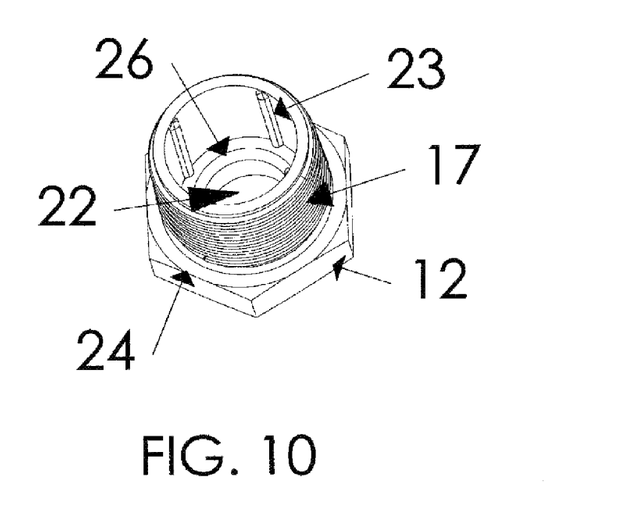
FIG. 10 is a perspective view of an externally-threaded plug that can be used in the most preferred embodiment of the present invention.
Figure 11:
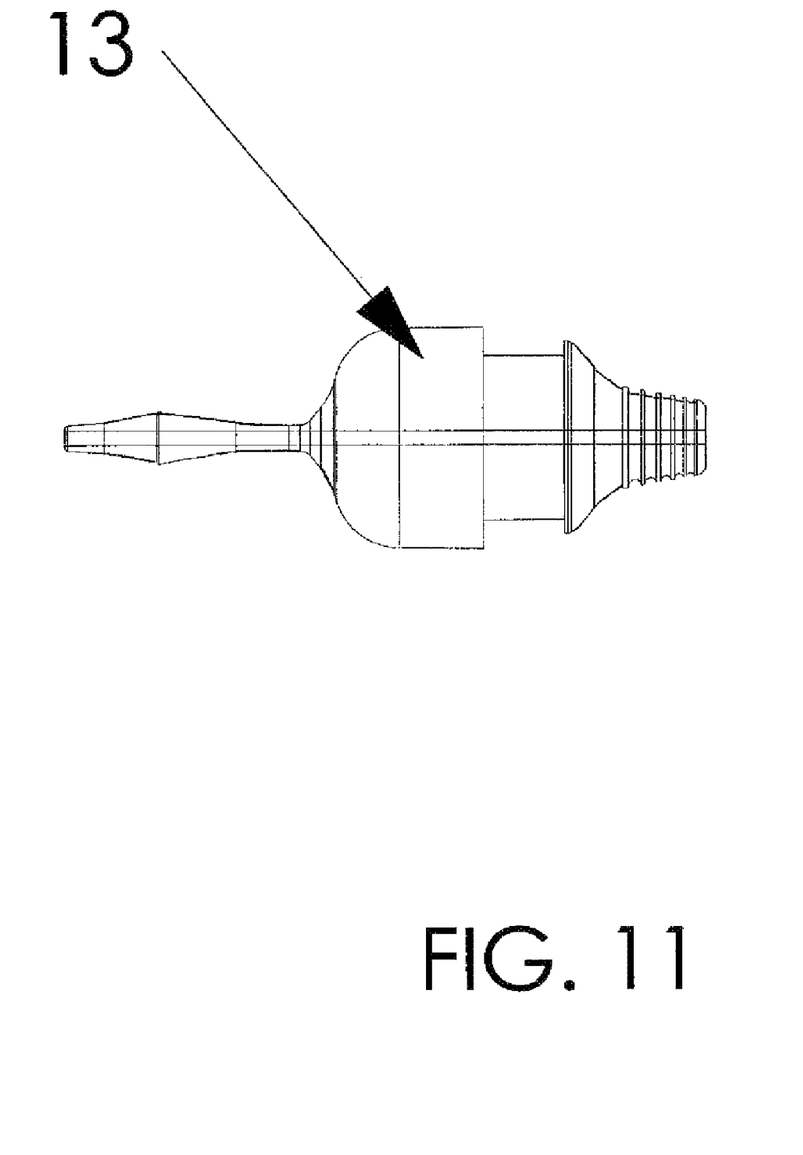
FIG. 11 is side view of a resilient sealing piece that can be used in the most preferred embodiment of the present invention, with the cone-shaped end of the sealing piece configured to surround the center sensor and provide a drip path to wick fluid away from the center sensor to reduce false signal production.
Figure 12:
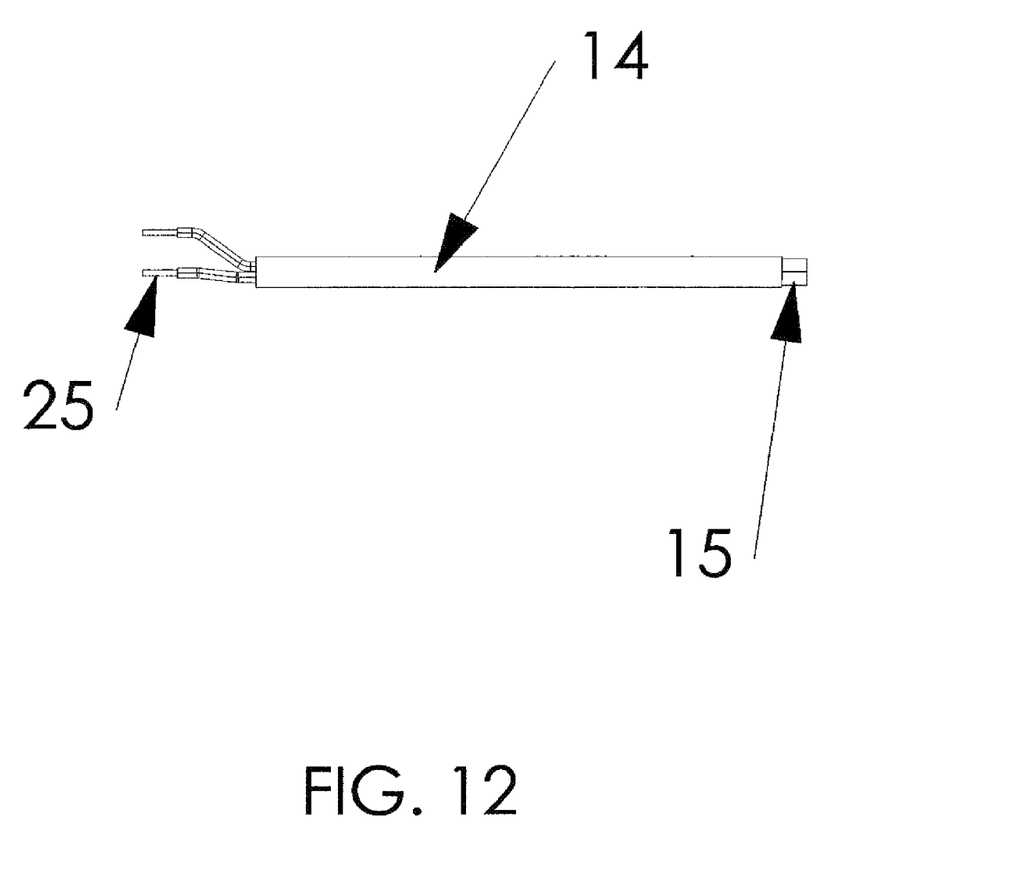
FIG. 12 is a side view of electrical wiring that can be used in the most preferred embodiment of the present invention between the two sensors in the probe and the signal-producing member.
Figure 13:
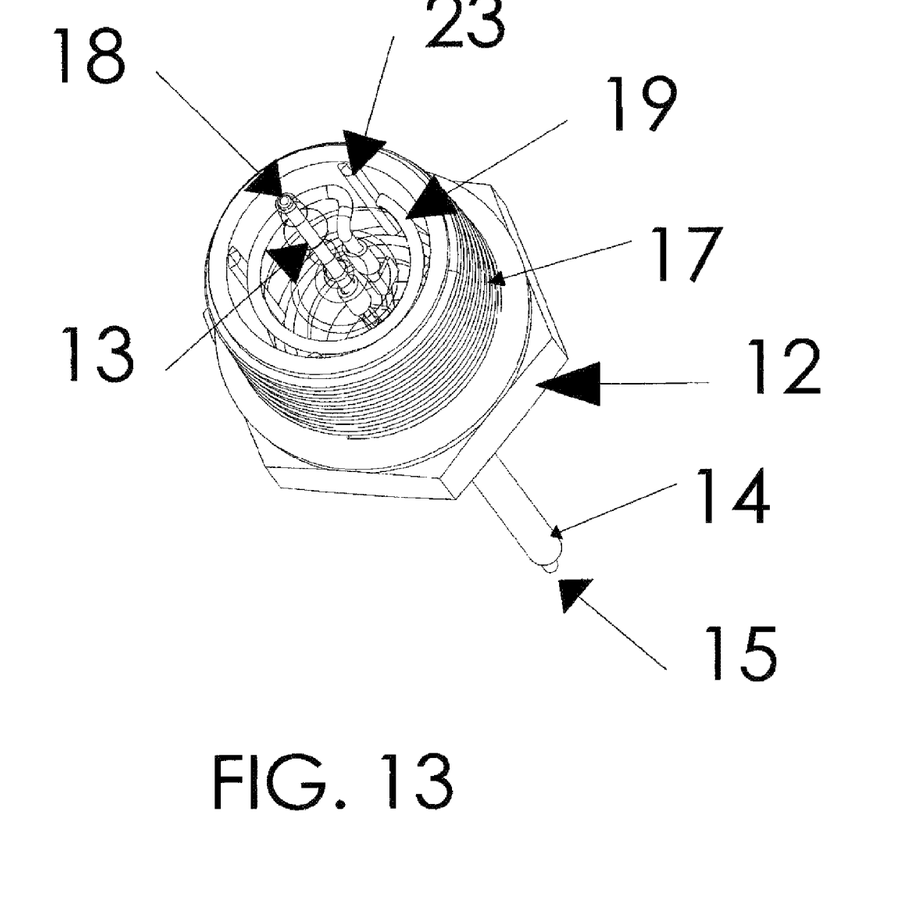
FIG. 13 is a perspective view of the circular sensor, center sensor, and resilient sealing piece in their preferred positions of use in the most preferred embodiment of the present invention.

FIGS. 4-14 show various views, features, and relative positioning thereof for the components of a sensing probe 11 that can be used in the most preferred embodiment of the present invention 1. FIG. 4 shows a side view of sensing probe 11 with its plug 12 having a hex-shaped base depending from a threaded portion 17 that is used for fast and easy connection thereof within the weep hole of a fluid-producing unit (not shown) and removal therefrom, an O-ring positioned around part of threaded portion 17, a center sensor 18 extending beyond one end of a false-trigger-reducing resilient piece 13 (wherein the cone-shaped portion of resilient piece 13 surrounding center sensor provides a drip path to wick fluid away from center sensor 18), and wiring 14 that reveals two wires 15, one of which would be connected to center sensor 18 and the other of which would be connected to the circular sensor shown in FIG. 10. In addition, FIG. 5 reveals more information about the preferred configuration of a circular sensor 19 that can be used in the most preferred embodiment of the present invention, FIG. 6 reveals more information about the preferred configuration of a center sensor 18 that can be used in the most preferred embodiment of the present invention, and FIGS. 7 and 8 reveal more information about the preferred configuration of a wire terminal 20 (two are used in sensing probe 11) with extensions 21 that can be used in the most preferred embodiment of the present invention to secure the proximal end of either center sensor 18 or circular sensor 19 and provide electrical communication with the signal generating module 43 attached to printed circuit board 33. Furthermore, FIG. 8 shows wire terminal 20 rotated approximately 90-degrees from the position illustrated in FIG. 7. Additionally, FIG. 9 shows an O-ring 16 that can be used in the most preferred embodiment of the present invention to provide a watertight seal between plug 12 and a fluid-producing unit when sensing probe 11 is secured in fixed relation to fluid-producing unit via its weep hole (not shown), while FIG. 10 shows more detail about the externally-threaded plug 12 that can be used in the most preferred embodiment of the present invention. FIG. 10 shows threads 17 on the external surface of plug 12, a concave area 24 for use in seating O-ring 16 around external threads 17 and providing a watertight seal for plug 12 when it is connected to the weep hole (not shown) of a fluid-producing unit, and the central opening 22 through plug 12 that permits the pull-through seating of the resilient sealing piece 13 shown in FIG. 14 that secures wiring 14 and center sensor 18 in their usable positions relative to plug 12. In addition, FIG. 10 shows several internal longitudinally-extending ribs 23 that are used to strengthen plug 12, assist in protecting circular sensor 19 when placed within the externally-threaded portion of plug 12 (as shown in FIG. 13), and help to secure resilient sealing piece 13 into its usable position. FIG. 10 also shows an inner O-ring 26 employed to assist in providing a watertight seal between resilient sealing piece 13 and the internal surfaces of plug 12. Although the configurations and relative sizes of present invention components shown in FIGS. 4-14 are preferred, some variation in perimeter configuration, size, connection, and/or number can be expected (such as the number of ribs 23, threads 17, and convolutions in the surface perimeter of resilient sealing piece 13 that are employed). The cone-shaped end of resilient sealing piece 13 shown in FIG. 14 around center sensor 18 is configured to provide a drip path to wick fluid away from center sensor 18 and thereby reduce false signal production.

Figure 14:
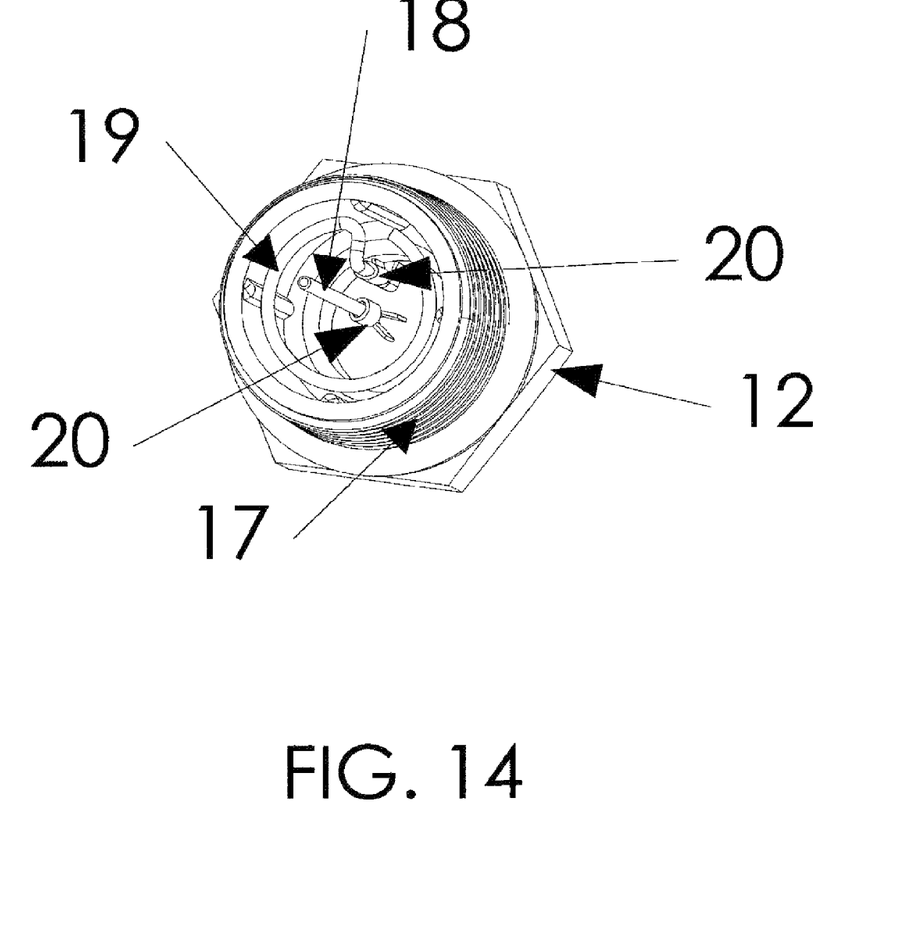
FIG. 14 is a perspective view of one end of the center sensor and the circular sensor each being connected to a wire terminal within the interior chamber of the externally-threaded plug used in the most preferred embodiment of the present invention.

FIGS. 12-14 also show additional information about components of sensing probe 11. FIG. 12 is a side view of electrical wiring 14 that can be used in the most preferred embodiment of the present invention between the two sensors (center sensor 18 and circular sensor 19) in probe 11 and the signal-producing member 2. Two wires 15 are shown at one end of electrical wiring 14 that extend toward signal-producing member 2, which are in opposition to the exposed and separated ends 25 that each become connected to a different one of the sensors of probe 11, either circular sensor 19 or center sensor 18. FIG. 13 shows circular sensor 19 and center sensor 18 surrounded by resilient sealing piece 13, with all three in their preferred positions of use in the most preferred embodiment of the present invention 1. To better see the connection of the proximal ends of circular sensor 19 and center sensor 18 each to a different wire terminal 20 (clearly visible and marked in FIG. 14), resilient sealing piece 13 in FIG. 13 has been made substantially transparent. FIG. 13 also shows how the longitudinally-extending ribs 23 within the threaded portion 17 of plug 12 help to define a position of use for circular sensor 19 and protect maintain it therein. FIG. 13 also shows the electrical wiring 14 extending from plug 12 in a direction opposed to center sensor 18. The same features in FIG. 13 are more clearly visible in FIG. 14, where the resilient sealing piece 13 has been omitted.

Figure 15:
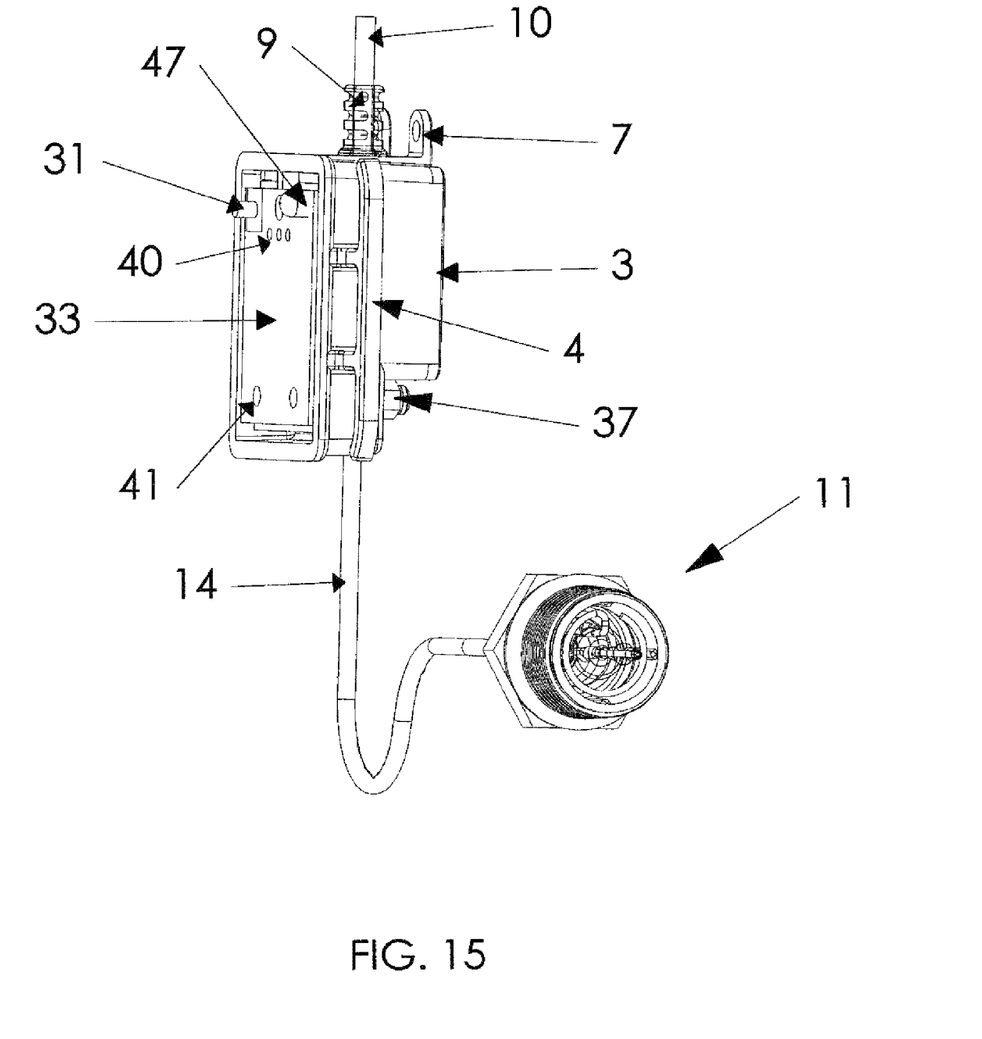
FIG. 15 is a perspective view of the most preferred embodiment of the present invention with the label and cover removed from the signal-producing member to show the test lamp and other features associated with the front surface of the printed circuit board.

Lastly, FIG. 15 is a perspective view of the most preferred embodiment of the present invention 1 with the label 5 and cover 28 removed from the signal-producing member 2 to show the test lamp 47 and other features associated with the front surface of the printed circuit board 33. Lamp 47 is preferably a light-emitting diode (LED), but not limited thereto. The orientation of sensing probe 11 to signal-producing member 2 shown in FIG. 15 is not critical. Furthermore, should an excess amount of electrical wiring 14 be available in a application of present invention 1, surplus electrical wiring 14 can be wound around wire wrapping feature 4 attached to one side of outer case 3. Although use of wire wrapping feature 4 is helpful to an installer, its presence is not critical. In FIG. 15 signal output wire 10 is visible through over-molding 9, which may be made from transparent or translucent material, but is not limited thereto. Also in FIG. 15, fasteners 36 and associated nuts 37 (see FIGS. 2 and 3 for numerical marking) secure the split ends 49 of electrical wiring 14 against outer casing 3 and facilitate the electrical communication needed between electrical wiring 14 and printed circuit board 33. The O-ring 35 shown in FIGS. 2 and 3 is also present but not visible in FIG. 15, being positioned between the back surface of printed circuit board 33 and an associated nuts 37. When the unnumbered extension of a different nut 37 (see FIG. 2 for the best view of the unnumbered extension) is positioned in each of the two fastener holes 41 shown in FIG. 15 at the bottom of printed circuit board 33, the signal-producing member 2 shown is ready for the addition of cover 28 and label 5. Whether signal-producing member 2 is placed into a level orientation (or not) relative to the vertically-extending wall of a secondary drain pan (not shown) is not critical, as the contact of rising fluid with either fastener 35 or split end of wiring 14 will cause signal generation and subsequent action to prevent overflow of fluid collected in the associated secondary drain pan (not shown).

Thus, it can be seen that present invention 1 provides a fluid-sensing switch system that monitors a pre-established threshold fluid level in the primary drain pan (not shown) inside an air conditioning unit or other condensate-producing unit (not shown), and also monitors a typically different pre-established threshold fluid level in a secondary drain pan (not shown) positioned under the unit, providing the option for redundant safety response capability. It does not require undue effort for accurate orientation to ensure proper and reliable signal generating operation and there is reduced sensitivity to false signaling. While at least one preferred embodiment has been presented herein, it should be appreciated that a vast number of variations also exist. It should also be appreciated that the exemplary embodiments disclosed herein are only examples, and are not intended to limit the scope, applicability, or configuration of the invention in any way. Instead, the scope of the present inventions should be determined by the appended claims.

What is claimed is:

1. A fluid-sensing switch system for use in monitoring fluid levels in the primary drain pan within a fluid-producing unit having a weep hole and optionally for simultaneous monitoring of fluid levels in a secondary drain pan having vertically-extending walls that is placed at least in part under the fluid-producing unit, said fluid-sensing switch system comprising:

a plug configured for connection to the weep hole of a fluid producing unit, said plug having an open end and an opposed partially closed end with a central opening;

a first fluid sensor configured and electrically connected to provide a first power potential, said first fluid sensor having a proximal end positioned within said plug and a distal end extending beyond said plug;

a second fluid sensor configured and electrically connected to provide a second power potential, with said second power potential being a neutral potential, said second fluid sensor having a proximal end positioned within said plug;

a resilient piece configured to surround all of said first fluid sensor except said distal end and maintain fixed positioning of said first fluid sensor relative to said plug, said resilient piece further having opposing cone-shaped ends with the one of said cone-shaped ends adjacent to said distal end of said rust fluid sensor being configured to provide a drip path to wick fluid away from said distal end;

an outer case;

a signal-generating module positioned within said outer case and secured in fixed relation thereto;

electrical wiring connected between said plug and said outer case that is connected to provide electrical communication between said first fluid sensor and said signal-generating module, and also connected to provide electrical communication between said second fluid sensor and said signal-generating module; and at least one signal output wire electrically connected to said signal-generating module so that when said plug is secured to the weep hole connected to a primary drain pan inside a fluid-producing unit and said at least one signal output wire is also electrically connected to the fluid-producing unit, said first fluid sensor will be positioned to monitor rising fluid in the primary drain wherein when the rising fluid exceeds a pre-determined threshold amount said electrical wiring will carry electrical communication from first fluid sensor and said second fluid sensor to said signal-generating module, which will generate a shut-off signal that will travel via said at least one signal output wire to the fluid-producing unit and cause fluid production to be stopped.

2. The fluid-sensing switch system according to claim 1 wherein said outer case is associated with a secondary drain pan positioned at least in part under the fluid-producing unit to which said plug is secured via a weep hole, and said at least one signal output wire is electrically connected to a pump associated with the secondary drain pan so that when the rising fluid exceeds a pre-determined threshold amount in the secondary drain pan said electrical wiring will carry electrical communication from first fluid sensor and said second fluid sensor to said signal-generating module, which will generate an activation signal that will travel via said at least one signal output wire to the pump and cause fluid to be evacuated from the secondary drain pan.

3. The fluid-sensing switch system according to claim 1 wherein said plug has an externally-threaded portion.

4. The fluid-sensing switch system according to claim 3 wherein said plug further comprises a hex-shaped base depending from said threaded portion.

5. The fluid-sensing switch system according to claim 1 further comprising a circuit board positioned within said outer case, and wherein said signal-generating module is connected to said circuit board.

6. The fluid-sensing switch system according to claim 5 further comprising a removable cover configured for snap-fit connection to said outer case and protection of said printed circuit board positioned in said outer case.

7. The fluid-sensing switch system according to claim 5 wherein said printed circuit board has a lamp electrically connected thereto, and said removable cover has accommodation for a viewing said lamp when said cover is snap-fit against said outer case for visual confirmation of signal-generation.

8. The fluid-sensing switch system according to claim 1 wherein said outer case further comprises attachment means for connection to the vertically-extending wall of a secondary drain pan.

9. The fluid-sensing switch system according to claim 8 wherein said attachment means is selected from a group consisting of double-sided tape and mounting brackets.

10. The fluid-sensing switch system according to claim 1 further comprising over-molding between said signal output wire and said outer case that is configured to provide a fixed relation of said signal output wire to said outer case.

11. The fluid-sensing switch system according to claim 10 wherein said outer case has an aperture and said over-molding is made from resilient material and configured for pull-through connection within said aperture to provide said fixed relation of said signal output wire to said outer case.

12. The fluid-sensing switch system according to claim 1 wherein said outer case has a wire wrapping feature configured to provide out-of-the-way positioning for surplus portions of said electrical wiring.

13. The fluid-sensing switch system according to claim 1 wherein said second fluid sensor has a generally circular configuration.

14. The fluid-sensing switch system according to claim 1 further comprising at least two O-rings associated with said plug that are configured to provide watertight connection with the weep hole of the fluid-producing unit.

15. The fluid-sensing switch system according to claim 1 further comprising an externally-located wire clamp associated with said outer case, with said wire clamp having a configuration that assists in maintaining secure electrical communication between said electrical wiring and said signal-generating module.

16. The fluid-sensing switch system according to claim 1 wherein said plug further comprises a plurality of longitudinally-extending strengthening ribs.

17. The fluid-sensing switch system according to claim 1 further comprising two wire terminals, with one of said wire terminals connected between said first fluid sensor and said electrical wiring, and the second of said wire terminals connected between said second fluid sensor and said electrical wiring.

18. A liquid sensing system to monitor the liquid level in a drain pan associated with a liquid producing unit, said liquid sensing system comprising:
  a first liquid sensor including a distal end portion disposed within the drain pan and electrically connected to a first power potential to selectively generate a first liquid level signal when the liquid within the drain pan reaches a first level;
  a second liquid sensor including a distal end portion disposed within the drain pan electrically connected to a second power potential to selectively generate a second liquid level signal when the liquid within the drain pan reaches a second level;
  said distal end portion of said first liquid sensor being disposed higher in the drain pan than said distal end portion of said second liquid sensor;
  a signal generating module operatively coupled to said first liquid sensor and said second liquid sensor to receive said first liquid level signal and said second liquid level signal such that when water within the drain pan reaches a predetermined level said first liquid sensor and said second liquid sensor contact the water causing said signal generating module to generate a shutoff signal fed to the liquid producing unit causing the liquid producing unit to cease producing liquid.

19. The liquid sensing system of claim 18 further including a secondary liquid sensor operatively coupled to said signal generating module and at least partially disposed in a secondary drain pan located below the drain pan to receive overflow liquid therefrom to sense when liquid within the secondary drain pan reaches a predetermined level and generate a signal fed to said signal generating module to activate a pump disposed in liquid transfer relationship relative to the second drain pan to pump liquid from the secondary drain pan.

20. The liquid sensing system of claim 19 wherein said signal generating module is coupled to a pump in liquid transfer relationship relative to the drain pan such that when liquid within the drain pan reaches a predetermined level the pump is activated to pump liquid from the drain pan.

21. The liquid sensing system of claim 18 wherein at least a portion of said second liquid sensor is disposed beneath said first liquid sensor.

22. The liquid sensing system of claim 21 wherein said second liquid sensor is arcuate.

23. The liquid sensing system of claim 22 wherein said second liquid sensor spans an arc of at least 180°.

24. The liquid sensing system of claim 23 wherein said second liquid sensor spans an arc of at least 350°.

25. The liquid sensing system of claim 19 wherein said second liquid sensor comprises a neutral potential.

26. The liquid sensing system of claim 18 wherein said signal generating module is coupled to a pump in liquid transfer relationship relative to the drain pan such that when liquid within the drain pan reaches a predetermined level the pump is activated to pump liquid from the drain pan.

27. The liquid sensing system of claim 18 wherein said first liquid sensor is covered by resilient material except said distal end.

28. The liquid sensing system of claim 27 wherein said resilient material comprises a drip path to wick liquid away from said distal end of said first liquid sensor.

29. The liquid sensing system of claim 18 wherein the liquid producing unit comprises an air handler including a liquid dam disposed therein; said first liquid sensor extending inwardly from the liquid dam.

30. A liquid sensing system to monitor the liquid level in a drain pan associated with a liquid producing unit, said liquid sensing system comprising:
- a first liquid sensor including a distal end portion disposed within the drain pan and electrically connected to a first power potential to selectively generate a first liquid level signal when the liquid within the drain pan reaches a first level;
- a second liquid sensor including a distal end portion disposed within the drain pan electrically connected to a second power potential to selectively generate a second liquid level signal when the liquid within the drain pan reaches a second level;
- said distal end portion of said first liquid sensor being disposed higher in the drain pan than said distal end portion of said second liquid sensor;
- a pump disposed within the drain pan;
- a signal generating module operatively coupled to said pump, said first liquid sensor and said second liquid sensor to selectively receive said first liquid level signal and said second liquid level signal such that when water within the drain pan reaches a predetermined level said first fluid sensor and said second fluid sensor contact the water causing said signal generating module to generate a pump signal fed to said pump to remove liquid from the interior of the drain pan.

* * * * *